United States Patent [19]

Zaleski

[11] 4,155,983

[45] May 22, 1979

[54] GOLD RECOVERY BY ADSORPTION FROM OZONIZED CYANIDATION LIQUOR

[76] Inventor: Wojciech J. Zaleski, 8A 11th St., Parkhurst, Johannesburg, South Africa

[21] Appl. No.: 843,625

[22] Filed: Oct. 19, 1977

[30] Foreign Application Priority Data

Oct. 28, 1976 [ZA] South Africa ...................... 76/6476

[51] Int. Cl.² .............................................. C01G 7/00
[52] U.S. Cl. ...................................... 423/25; 423/27; 423/43; 423/143; 75/106; 75/118 R
[58] Field of Search ............................. 423/25, 29–31, 423/34, 42, 43, 143; 75/105, 106, 118 R

[56] References Cited

U.S. PATENT DOCUMENTS

| | | | |
|---|---|---|---|
| 976,043 | 11/1910 | Clancy | 423/29 |
| 1,658,249 | 2/1928 | McCluskey | 423/31 |
| 3,736,239 | 5/1973 | George et al. | 423/143 |
| 3,970,737 | 7/1976 | Davidson | 75/118 |

*Primary Examiner*—Brian Hearn
*Attorney, Agent, or Firm*—Beveridge, DeGrandi, Kline & Lunsford

[57] ABSTRACT

A process for recovering gold from a gold bearing liquor arising from a cyanidation process including the steps of treating the liquor with ozonized air or ozonized oxygen, adsorbing the gold values from the treated liquor on activated carbon, and recovering the gold values from the loaded activated carbon.

2 Claims, 1 Drawing Figure

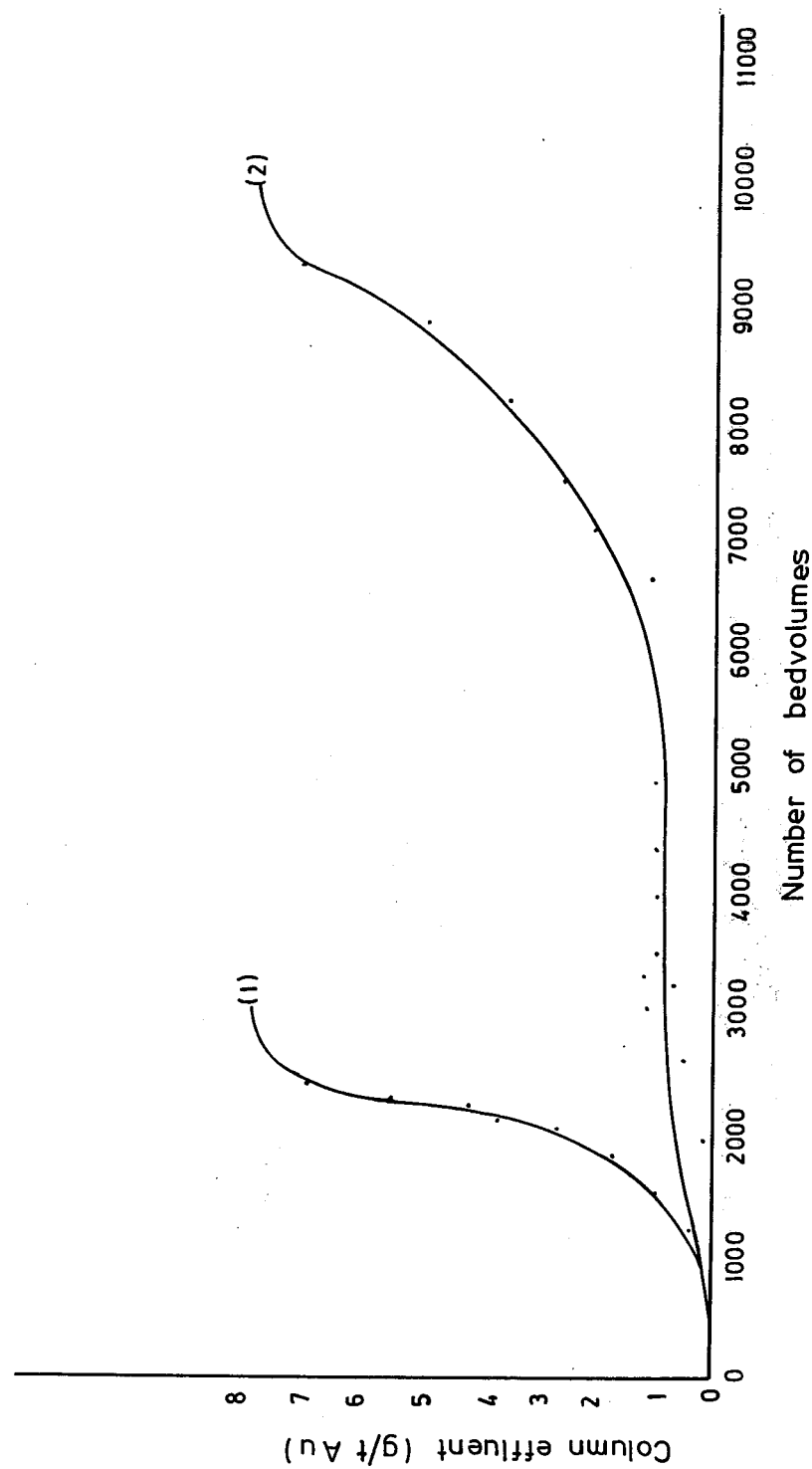

GOLD RECOVERY BY ADSORPTION FROM OZONIZED CYANIDATION LIQUOR

BACKGROUND OF THE INVENTION

1. Field of the Invention

This invention relates to the recovery of gold from gold-bearing liquors, particularly such liquors obtainable in the known cyanidation process.

2. Description of the Prior Art

The cyanidation process is a well known process for extracting gold values from gold bearing ores. The process involves finely grinding the ore and then leaching the ore with a suitable cyanide solution. The cyanide leach solution is generally a sodium cyanide leach solution which contains calcium hydroxide or other suitable alkali to maintain the pH above about 10. The gold values are leached in the form of the aurocyanide $(Au(CN)_2)$ ions. The following reaction occurs with sodium cyanide leach solution:

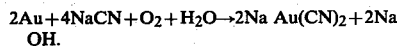

The gold values may be recovered from the gold rich leach solution by any of a number of methods. The preferred method is to adsorb the gold values onto activated carbon and then desorb the gold values therefrom by treating the loaded carbon with water of low ionic strength such as softened or deionised water. Such methods are described in the specification of our South African Pat. No. 73/8939 and the specification of our co-pending South African patent application No. 76/4204.

SUMMARY OF THE INVENTION

According to the present invention, a process for recovering gold from a gold bearing liquor arising from a cyanidation process includes the steps of treating the liquor with ozonised air or ozonised oxygen, adsorbing the gold values from the treated liquor on activated carbon, and recovering the gold from the loaded activated carbon.

BRIEF DESCRIPTION OF THE DRAWING

The single FIGURE shows a comparison of adsorption data obtained with a gold bearing liquid treated according to the process of the present invention with the adsorption data obtained with a similar solution which was not subjected to an ozone pretreatment.

DESCRIPTION OF THE PREFERRED EMBODIMENTS

The gold bearing liquor may for example be a pregnant leach solution from a cyanidation process or effluent from a gold plant employing the cyanidation process.

Pretreatment with ozonised oxygen or ozonised air results in the precipitation of base metal, e.g. copper, cobalt or nickel, and silver cyanide complexes; in the oxidation of organic matter such as detergents, flocculating agents, flotation reagents and dispersants which are present in the liquor; and in a decrease in the concentration of free cyanide in the liquor. The duration of the pretreatment, which may for example be effected by bubbling the ozonised gas through the liquor, will depend on the nature of the liquor, but is preferably continued until the liquor is substantially free from base metals, organic matter, and free cyanide. This occurs typically when the pH of the liquor has decreased to below approximately 8.

The ozonised gas may be generated using known and commercially available ozone generators.

The pretreatment results in a significant increase in the equilibrium or saturation loading of gold on the activated carbon thereby improving significantly the recovery of gold from the gold rich liquor.

The gold may be recovered from the loaded carbon by treating the carbon with water of low ionic strength in the manner described above.

The following examples illustrate the process of the invention.

EXAMPLES 1-4

Gold bearing solutions originating from leaching a gold bearing ore with a sodium cyanide leach solution in a standard cyanidation process were treated by bubbling ozonised air at a rate of approximately 200 ml/min at ambient conditions of temperature and pressure through a 500 ml sample of the solution in a beaker equipped with a magnetic stirrer. The ozonised air was produced using a Gallenkamp ozone generator type GE-150. The treatment resulted in each case in the formation of a white precipitate and a decrease in the pH.

The results obtained are tabulated in Table I.

From the tabulated results it is seen that copper, nickel, silver and iron are precipitated by the ozone treatment, while gold remains unaffected.

A treatment lasting of the order of 1-2 hours was found sufficient to yield a liquor substantially free of base metals and having a pH value of 7,7.

EXAMPLE 5

A sample of clarified pregnant solution from a gold plant using the standard cyanidation process was subjected to a pretreatment according to the procedure of Examples 1 to 4 until the pH value was 7,7.

The resulting solution was pumped at ambient temperature at a rate of 14 bed volumes per hour through a carbon column (30 cm length $\times$ 1 cm internal diameter) containing 10 g of a commercially available activated carbon. The resulting adsorption data is represented graphically by line (2) in the attached drawing.

In the same FIGURE is represented graphically by line (1) the adsorption data obtained with a similar solution which was not subjected to an ozone pretreatment, but merely had its pH value adjusted to 7,7 using concentrated sulphuric acid.

A comparison of the two sets of results indicates the marked benefits of the ozone pretreatment. A 3-4 fold increase of the equilibrium or saturation loading of gold, giving an approximate 17 weight percent loading following ozone pretreatment is observed.

It has been adequately demonstrated that the ozone treatment of gold plant pregnant solution has a most beneficial effect on the subsequent adsorption of the contained gold values onto activated carbon. A significant increase in the equilibrium or saturation gold loading from a value of about 3,7 weight percent gold (1 800 bedvolumes pregnant solution as influent) to a value of about 17 percent (9 000 bedvolumes ozonised pregnant solution as influent) indicates that both the decrease in influent pH together with the precipitation of silver and base metals, the oxidation of organic constituents and the destruction of free cyanide have a marked effect on increasing gold adsorption capacity. Furthermore, a decrease in influent pH shifting the carbonate equilibrium to the bicarbonate side overcomes the most troublesome build-up of calcium carbonate on the activated carbon. This precipitate would otherwise have to be removed periodically with dilute hydrochloric acid.

TABLE I

OZONE TREATMENT OF VARIOUS PREGNANT SOLUTIONS

Air/$O_3$ Mixture at approximate flow rate of 200 ml/min. bubbled through 500 ml of solution in an open beaker. After 1 hour solution filtered and analysed.

| Ele- | Solution Number | | | | | | | | |
|---|---|---|---|---|---|---|---|---|---|
| | 1 | | 2 | | 3 | | 4 | | 5 |
| ment | B: before Air/$O_3$ treatment; A: after Air/$O_3$ treatment | | | | | | | | |
| (g/t) | B | A | B | A | B | A* | B | A | B | A |
| Au | 7,9 | 7,5 | 495 | 485 | 4,25 | 4,25 | 8 | 8 | 85 | 83 |
| Ag | 1,6 | 0,2 | 7,1 | 0,4 | 0,2 | 0,1 | 1 | 0,9 | 12 | 10 |
| Cu | 6,3 | 0,6 | 5,0 | 0,2 | 9 | 3 | 7 | 2 | — | — |
| Fe | 2,3 | 0,9 | 0,6 | 0,5 | 2 | 1 | 3 | 0,2 | — | — |
| Ni | 2,0 | 1,7 | 32 | 0,2 | 3,5 | 0,8 | 2 | 1,5 | 1400 | 66 |
| Co | — | — | — | — | 20 | 17 | <0,5 | <0,5 | — | — |
| pH | 9,2 | 7,0 | 12,2 | 12,0 | 10,95 | 2,2 | 9,6 | 7,9 | 13,0 | 13,0 |

Sol. No. 1 Clarified gold plant pregnant solution from Western Deep Levels gold mine, batch from Nov. 1975
Sol. No. 2 Eluate from charcoal columns, composite sample
Sol. No. 3 Pregnant calcine leach liquor
Sol. No. 4 Clarified gold plant pregnant solution
Sol. No. 5 Combined eluate from charcoal columns
*After 16 hours treatment

I claim:
1. A process for recovering gold from a gold bearing liquor arising from a cyanidation process and containing gold, silver and base metal values, organic matter and free cyanide, including the steps of treating the liquor with ozonized air or ozonized oxygen thereby precipitating silver and base metal values, oxidizing the organic matter and decreasing the concentration of free cyanide in the liquor; adsorbing the gold values from the treated liquor on to activated carbon; and recovering the gold values from the loaded activated carbon.

2. A process according to claim 1 wherein the pretreatment is continued until the pH value of the liquor has been reduced to a value below approximately 8.

* * * * *